(No Model.) 2 Sheets—Sheet 2.

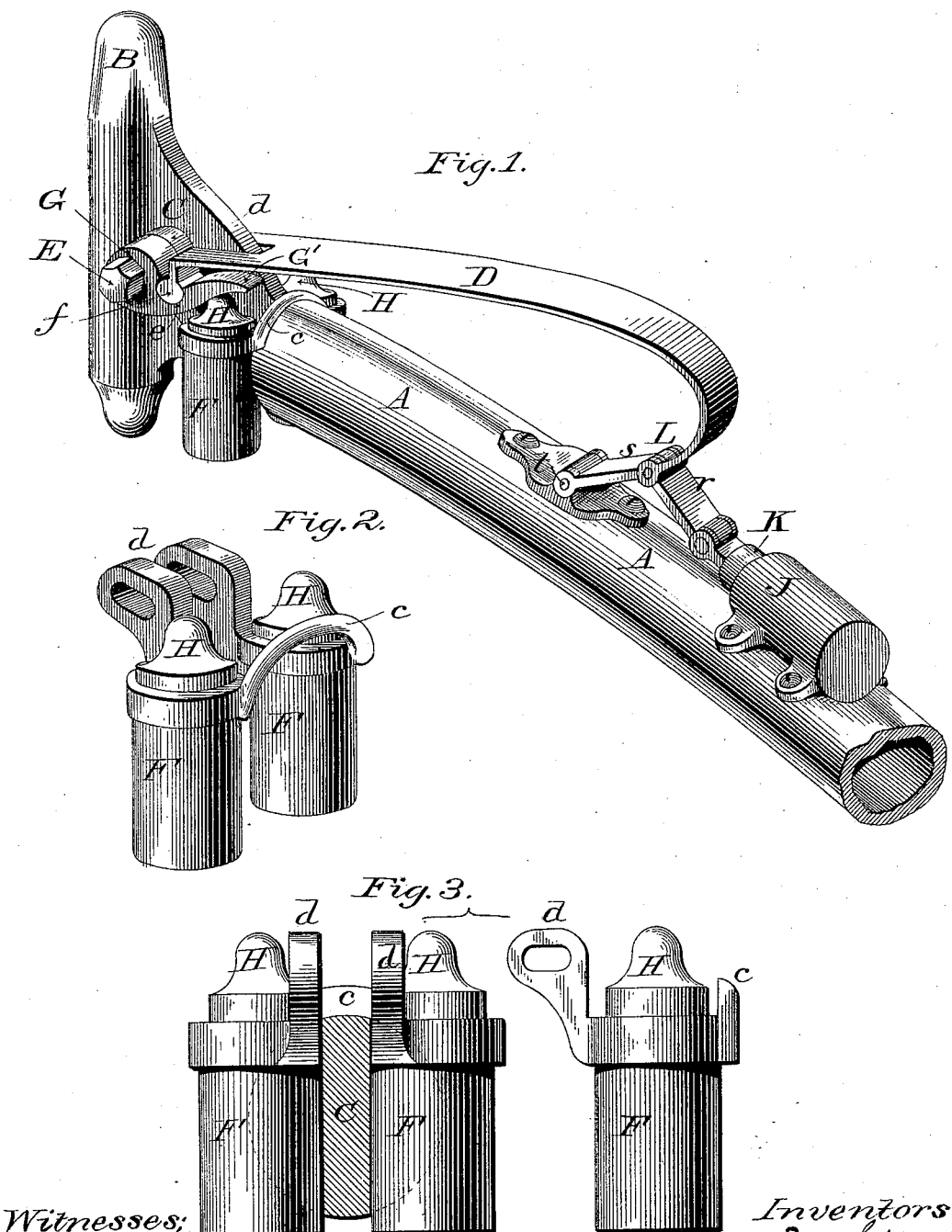

H. M. STILWELL & J. C. McNAB.
BICYCLE.

No. 308,442. Patented Nov. 25, 1884.

Witnesses:

Inventors:
Henry M. Stilwell,
John C. McNab,
by Dodge & Son,
Attys.

UNITED STATES PATENT OFFICE.

HENRY M. STILWELL AND JOHN C. McNAB, OF ROCHESTER, NEW YORK.

BICYCLE.

SPECIFICATION forming part of Letters Patent No. 308,442, dated November 25, 1884.

Application filed May 15, 1884. (No model.)

*To all whom it may concern:*

Be it known that we, HENRY M. STILWELL and JOHN C. McNAB, both of Rochester, in the county of Monroe and State of New York, have invented certain new and useful Improvements in Bicycles, of which the following is a specification.

Our invention relates to bicycle-seat springs; and it consists in supporting the same upon air-cushions or confined bodies of air in such manner as to relieve the rider of the jar and concussion arising from a rigid connection, such as commonly used between the frame of the bicycle and the seat-spring, and to avoid the severe strains to which the machine is necessarily subject when such rigid connections are used.

Figure 4:
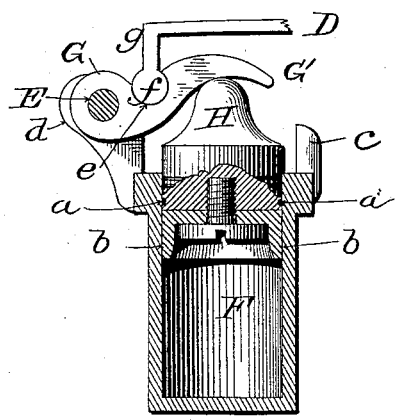
Figure 5:
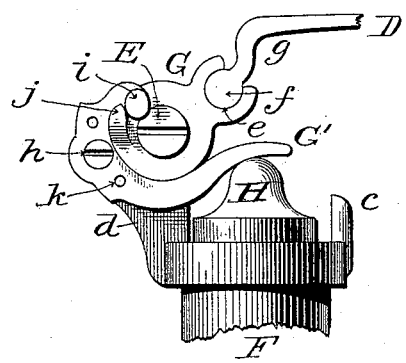
Figure 6:
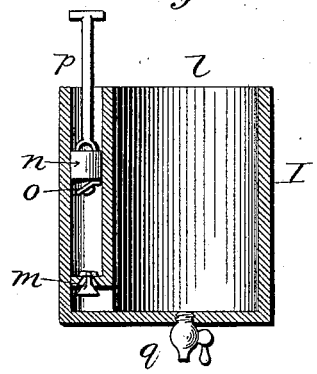

In the accompanying drawings, Figure 1 is a perspective view of a seat-spring and a portion of the backbone of a bicycle, showing our improved connections; Fig. 2, a perspective view of the air-cushion cylinders as used at the forward end of the spring; Fig. 3, a front face and side view of the same; Fig. 4, a sectional view of one cylinder and piston, showing also one lever and the fore end of the spring; Fig. 5, a view of the lever in two parts; Fig. 6, a sectional view of a cylinder provided with an air-pump or device for decreasing the pressure.

Before explaining our invention we desire to state that we do not broadly claim an air-cushion to prevent the transmission of shocks from one part of a vehicle to another, as that idea is old in a general sense, having been employed for car-buffers and draw-heads, and in vehicle-springs. In applying this idea to bicycles it is not the design ordinarily to depend upon the air-cushion to afford all the elasticity or yielding action required, though such plan may be followed in some cases; but it is the intention to combine such elastic cushion or support with the usual spring to more perfectly prevent the transmission of those slight shocks or the continual jar and vibration which now occurs in riding over a surface which, though comparatively smooth as a whole, still contains many seams, joints, or slight irregularities—as, for instance, a brick or Belgian-block pavement, a macadamized road, a board walk, or the like—which jar or vibration cannot be taken up by a spring of sufficient stiffness to support the weight of a rider in passing over a rougher surface.

It is essential in bicycles that whatever support is employed for the forward end of the spring shall be below it, as otherwise it must seriously interfere with the seating of the rider, and will give the machine a clumsy and ungainly appearance, besides adding to the danger of injury to the rider if thrown forward. It is likewise very desirable that the support for the rear end of the spring be below the spring, in order that it may not offer any obstacle to the rider in mounting the machine. The construction which we have adopted is especially designed with reference to the requirements noted, and is found in practice to give most satisfactory results.

Referring again to the drawings, A indicates the backbone of a bicycle; B, the pivot or upright fore end thereof, and C the flattened neck, which connects said parts, and to which the front end of the saddle-spring D is ordinarily attached by a bolt or pin, E, which in the present instance is utilized to secure and assist in sustaining the cylinders F F of the air-cushion, and also as a pivot for levers G G, which are interposed between the spring D and the pistons H H of the air-cushion. The air-cylinders F F are bored accurately and nicely finished on the inside to receive pistons H H, which are likewise turned true and highly polished to fit closely within the cylinders. Fine circumferential grooves $a$ are advisably formed in the pistons, which, being filled by the oil used to lubricate the pistons, insure a perfectly air-tight fit of the pistons and cylinders.

Instead of or in addition to the grooves, we may use packing or cups $b$, preferably of rawhide pressed into shape, closely fitted within the cylinder, and secured to the lower ends of the pistons H H, with their open ends turned toward the bottoms of the cylinder, as shown in Fig. 4. Two cylinders, F F, are preferably connected by a yoke, $c$, which rests upon the neck C of the backbone and serves to suspend the cylinders at the sides thereof, as in Figs. 1 and 3. Perforated ears $d$ also extend forward and upward from the cylinders, and are supported by the bolt or pin E, as already intimated. In this way the cylinders are firmly secured to the backbone and are brought at the sides thereof, where they are scarcely noticeable, and cannot in any way interfere with the turning of the machine or with mounting, and at such height that they do not in the least modify the elevation of the spring D. This construction permits the application of the improved device to any machine of the general class or style for which it is designed without any previous preparation of the machine other than the removal of the ordinary spring. The pistons H H are reduced in diameter and rounded at their upper ends above the cylinders to form bearings for levers G G, which are pivoted upon the bolt or pin E, as plainly shown in Figs. 1 and 4, and these levers are formed with circular seats or recesses $e$, to receive journals or cylindrical ends $f$, formed upon downwardly-turned arms $g$ at the front end of spring D. Each lever G is provided with a tail or extension, G', which may be formed integral therewith, as in Figs. 1 and 4, or separately, as in Fig. 5, in which latter case the portion G' will be mounted upon a separate pivot, $h$, and the two parts G and G' will be made with interlocking shoulders $i$ $j$, as shown in said figures. When made separate, parts G' will be provided with a series of holes, $k$, and the neck C of backbone A will be furnished with corresponding series of holes, so that by shifting the pivot screw or pin $h$ the leverage can be changed as desired. The tails G' bear upon the rounded ends or heads of pistons H H, so that when the levers G G are depressed through weight put upon spring D the tails G' G' act upon and depress said pistons, thereby compressing the air in the cylinders F F until a state of equilibrium is reached between the compressed air and the compressing force.

It will be observed that with a proper proportioning of the parts a body of air can be secured which will support any load that may ever come upon a bicycle in ordinary use, and that the resistance increases just in proportion as the compressing force increases, always retaining, however, a high degree of elasticity, and avoiding any positive or unyielding stop, such as forms the limit of movement of an ordinary bicycle-seat spring. Where the levers are made each in a single piece, the ears $d$ may be slotted, so that the cylinder can be moved to and from the pivot E, and the leverage be thereby varied. We prefer, however, instead of or in addition to varying the leverage, to supply the cylinders with air under pressure greater than that of the atmosphere when a heavier load than usual is to be carried by the spring, and to permit such variation to be made quickly and easily we provide the pistons with an air-pump, I, of simple construction, as shown in Fig. 6, in which $l$ indicates a small cylinder communicating with the lower end of cylinder F, and containing an outwardly-closing check-valve, $m$, and a piston, $n$, having an inwardly-opening valve, $o$, and rod or stem $p$. The air-cylinder is also furnished with an outlet-cock, $q$, by which to permit the escape of air when raised above atmospheric pressure, if such escape becomes desirable. The rear end of spring D is likewise sustained by an air cushion or support to take up vibration, jar, or concussion at that point and to prevent rattling, a cylinder, J, being provided with a close-fitting piston, K, the outer end of which may be connected directly to the tail of spring D, or, as is preferred, to a leaf, $r$, of the toggle-lever or coupling L, the outer leaf, $s$, of which is connected by a joint to a fixed post or stud, $t$, on the backbone, the rear end of spring D being connected with the toggle-lever at the point of union of its two members, as plainly shown in Fig. 1.

It is obvious that the details of construction may be considerably modified—as, for instance, by arranging the ends of the spring to bear directly upon the pistons, interposing different forms of levers or connecting devices between the spring and the frame of the machine, or in other respects relating to details.

Instead of spring D, a rigid bar may be used, though we prefer to employ a spring. The air-cushion or support interrupts the transmission of jars and vibrations from the saddle-spring to the machine, and from the machine to the saddle-spring, and effectually stops the ringing sound common to machines now in use. It will of course be understood that the same device is applicable to tricycles or like machines or vehicles without material change, and that the piston may be fixed and the cylinders arranged to move.

Instead of an air-pump, the cylinder or piston may be furnished with an adjustable end.

We are aware that it has been proposed to provide air-springs for cars and other vehicles with air-pumps connected with the running-gear in such manner as to cause a constant supply of air to be forced into the air-chambers of the springs during the travel of the vehicle, and that it was further proposed in such case to provide a safety-valve or escape to prevent excess of pressure. This we do not claim. Our plan differs from that mentioned, in that the pump is not actuated by or connected with any part of the vehicle having independent motion, but is arranged to be operated manually, and thus only. It further differs in that instead of providing an automatic outlet or safety-valve we provide simply a cock to be opened or closed manually, so that the air body may be varied in volume according to the weight to be sustained.

Having thus described our invention, what we claim is—

1. In combination with a bicycle or like vehicle, a saddle spring or bar, a cylinder located below said bar and carried by the frame of the vehicle, and a piston fitting said cylinder and located beneath the saddle bar or spring, substantially as described and shown, whereby the saddle bar or spring is elastically supported, but is left without projections above its upper face.

2. In combination with a bicycle, an air-cylinder, a piston fitting air-tight within said cylinder, a lever bearing against said piston, and a saddle spring or bar bearing upon said lever, the piston and the lever-pivot being adjustable one in relation to the other, substantially as and for the purpose explained.

3. In combination with a backbone, A, cylinders F F, provided with pistons H H to support the saddle bar or spring, and connected by a yoke, c, adapted to straddle the backbone and support the cylinders, substantially as shown.

4. In combination with a frame or backbone, A, cylinders F F, connected by yoke c and provided with perforated ears d, fastening bolt or pin E, and pistons H H, fitting said cylinders and adapted to sustain the seat bar or spring, substantially as shown and described.

5. In combination with a frame or backbone, A, cylinders F F, connected by yoke c and provided with slotted ears d, pin or bolt E, passing through said ears, pistons H H, fitting within said cylinders, and saddle spring or bar D, supported by said pistons, substantially as shown and described.

6. In combination with a bicycle or like vehicle and its saddle bar or spring, an air-cylinder provided with a cock and an air-pump, both the cock and the pump being adapted to be actuated manually, whereby any desired air-pressure may be established and maintained within the cylinder.

7. In combination with a bicycle or like vehicle, a saddle spring or bar and an air-cushion or support interposed between the frame of the vehicle and said spring or bar at or near each end.

8. In combination with a bicycle or like vehicle and its saddle bar or spring, an air-cushion or support at the rear end of said bar or spring to take up the vibration, jar, and concussion and prevent noise.

9. In combination with frame or backbone A, spring or bar D, toggle L, post H, cylinder J, and piston K, said parts being constructed, combined, and arranged to operate substantially as set forth.

10. In combination with a bicycle or like vehicle, a saddle spring or bar and an air-cushion or support therefor located wholly beneath the spring or bar, substantially as and for the purpose set forth.

HENRY M. STILWELL.
JOHN C. McNAB.

Witnesses:
A. C. MANN,
M. F. O'BRIEN.